(12) United States Patent
Kim et al.

(10) Patent No.: US 11,143,844 B2
(45) Date of Patent: Oct. 12, 2021

(54) IMAGING LENS AND CAMERA MODULE COMPRISING THE SAME

(71) Applicant: LG INNOTEK CO., LTD., Seoul (KR)

(72) Inventors: Ji Sung Kim, Seoul (KR); Dae Sik Jang, Seoul (KR); Soo Min Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/957,953

(22) PCT Filed: Jan. 18, 2019

(86) PCT No.: PCT/KR2019/000741
§ 371 (c)(1),
(2) Date: Jun. 25, 2020

(87) PCT Pub. No.: WO2019/143166
PCT Pub. Date: Jul. 25, 2019

(65) Prior Publication Data
US 2020/0326508 A1    Oct. 15, 2020

(30) Foreign Application Priority Data

Jan. 19, 2018    (KR) .................. 10-2018-0007114

(51) Int. Cl.
*G02B 15/00*        (2006.01)
*G02B 13/00*        (2006.01)
(Continued)

(52) U.S. Cl.
CPC ....... *G02B 13/0035* (2013.01); *G02B 13/009* (2013.01); *G02B 15/143* (2019.08); *G02B 5/20* (2013.01)

(58) Field of Classification Search
CPC ............ G02B 13/0035; G02B 13/009; G02B 15/143; G02B 15/1431; G02B 15/143101;
(Continued)

(56) References Cited

FOREIGN PATENT DOCUMENTS

JP        2005-274662 A        10/2005
JP        2007-072291        *    3/2007    ............. G02B 15/16
(Continued)

OTHER PUBLICATIONS

International Search Report in International Application No. PCT/KR2019/000741, filed Jan. 18, 2019.

*Primary Examiner* — Joseph P Martinez
(74) *Attorney, Agent, or Firm* — Saliwanchik, Lloyd & Eisenschenk (57) ABSTRACT

An embodiment provides an imaging lens comprising first to third lens groups arranged sequentially from an object side to an image side and having refractive power, wherein the distances of the second lens group and the third lens group from the first lens group are variable such that a tele mode having a narrow angle of view and a wide mode having a wide angle of view can be implemented, the EFL in the tele mode is no more than 2.5 times the EFL in the wide mode, $2<F_{number}<5$ and $15\text{ mm}<TTL\le 40\text{ mm}$.

20 Claims, 12 Drawing Sheets

(51) Int. Cl.
*G02B 15/14* (2006.01)
*G02B 5/20* (2006.01)

(58) Field of Classification Search
CPC .... G02B 15/143103; G02B 15/143105; G02B 15/143107; G02B 15/1435; G02B 15/143501; G02B 15/143503; G02B 15/143505; G02B 15/143507; G02B 9/12; G02B 9/14; G02B 9/16; G02B 9/18; G02B 9/20; G02B 9/22; G02B 9/24; G02B 9/26; G02B 9/28; G02B 9/30; G02B 9/32
See application file for complete search history.

(56) References Cited

FOREIGN PATENT DOCUMENTS

| | | |
|---|---|---|
| JP | 2007-72291 A | 3/2007 |
| JP | 2013-44964 A | 3/2013 |
| JP | 2014-134703 A | 7/2014 |
| KR | 10-0467953 B1 | 1/2005 |
| KR | 10-0604315 B1 | 7/2006 |
| KR | 10-0771795 B1 | 10/2007 |
| KR | 10-2009-0046060 A | 5/2009 |

\* cited by examiner

IMAGING LENS AND CAMERA MODULE COMPRISING THE SAME

CROSS-REFERENCE TO RELATED APPLICATIONS

This application is the U.S. national stage application of International Patent Application No. PCT/KR2019/000741, filed Jan. 18, 2019, which claims the benefit under 35 U.S.C. § 119 of Korean Application No. 10-2018-0007114, filed Jan. 19, 2018, the disclosures of each of which are incorporated herein by reference in their entirety.

TECHNICAL FIELD

Embodiments relate to an imaging lens and a camera module and a digital device including the same.

BACKGROUND ART

Conventional film cameras have been replaced by a camera module for mobile phones using a small-sized solid-state imaging element, such as a CCD or a CMOS, a digital still camera (DSC), a camcorder, a PC camera (an imaging device attached to a personal computer), etc., and these imaging devices are being developed with the goal of miniaturization and slimming.

In order to satisfy this trend, miniaturization of light receiving elements, such as a charge coupled device (CCD), mounted in small-sized solid-state imaging devices is underway, and the part of an imaging device which occupies the largest volume is an imaging lens part.

Therefore, the element of the imaging device, which is the key issue in terms of miniaturization and slimming, is an imaging lens which forms an image of an object.

Here, the imaging lens requires not only a small size but also high performance in response to the high performance of the light receiving elements. However, a zoom lens, in which distances between lenses are variable, is widely used as the miniaturized imaging lens in order to implement high performance.

The conventional imaging lens, particularly the zoom lens, may be excessively thick and thus not have a small size, and may be less sensitive at a high resolution and thus not implement high performance.

DISCLOSURE

Technical Problem

Embodiments provide an imaging lens including a subminiature zoom lens having a small thickness.

Embodiments provides an image lens, the sensitivity of which is not deteriorated even at a high resolution, so as to implement high performance.

Technical Solution

In one embodiment, an imaging lens includes first to third lens groups arranged sequentially from an object side to an image side and having refractive power, wherein distances to the second lens group and the third lens group from the first lens group are variable such that a tele mode having a narrow angle of view and a wide mode having a wide angle of view can be implemented, an EFL in a tele mode is no more than 2.5 times an EFL in a wide mode, $2 < F_{Number} < 5$, and 15 mm $< TTL \leq 40$ mm.

At least one second lens of the second lens group may have an object surface configured to be convex towards the object side and an image surface configured to be convex towards the image side.

The first lens group may include one lens, the second lens group may include two lenses, and the third lens group may include four lenses.

The first lens group may include one lens, the second lens group may include one lens, and the third lens group may include three lenses.

The EFLs of the image lens may be within a range of 8.6 to 16.5.

In another embodiment, a camera module includes the above-described imaging lens; a filter configured to selectively transmit light having passed through the imaging lens depending on a wavelength of the light; a light receiving element configured to receive light having passed through the filter, wherein a maximum distance between the first lens group and the light receiving element on an optical axis, as defined as a TTL, is more than 15 mm and is no more than 40 mm.

A maximum aperture of lenses forming the first to third lens groups may be 0.2 to 0.3 times the TTL.

The maximum aperture of the lenses may be 5 mm or less.

Advantageous Effects

An imaging lens having a zoom function according to one embodiment may be implemented as a subminiature zoom lens having a small thickness.

Further, the sensitivity of the imaging lens is not deteriorated even at a high resolution, and thus the imaging lens may implement high performance.

BEST MODE

Hereinafter, embodiments will be described with reference to the annexed drawings and description.

In the following description of the embodiments, it will be understood that an 'object surface' means the surface of a lens facing an object side based on an optical axis, and an 'image surface' means the surface of the lens facing an image side based on the optical axis.

Further, in the embodiments, it will be understood that "+ power" of a lens indicates a convergent lens which converges parallel light, and "− power" of a lens indicates a divergent lens which diverges parallel light.

An imaging lens according to embodiments may include first to third lens groups arranged sequentially from an object side to an image side and having refractive power, and the first to third lens groups may be formed of plastic. The total magnification of the imaging lens is no more than 2.5 times, and particularly, a ratio of tele EFL/wide EFL may be no more than 2.5, and tele EFL and wide EFL may be equivalent focal lengths (EFLs) of the imaging lens in a tele mode and a wide mode. Further, in the imaging lens, $2<F_{Number}<5$ and 15 mm$<$TTL$\leq$40 mm may be satisfied. That is, the distances to the second lens group and the third lens group from the first lens group are variable such that a tele mode having a narrow angle of view and a wide mode having a wide angle of view can be implemented, and the EFL in the tele mode is no more than 2.5 times the EFL in the wide mode.

Among the first to third lens groups, the first lens group may be formed of a prism, have a thickness of 3 mm or more, and be stationary. When the thickness of the first lens group is 3 mm or more, light is focused and may thus secure resolution. Further, second and third lens groups may move in the direction of an optical axis.

Further, in order to reduce the total volume of the imaging lens, the maximum aperture of the first to third lens groups may be defined as T, and T may be 5 mm or less. In addition, a ratio of T to TTL (T/TTL) may be 0.2 to 0.3, for example, 0.25. Here, when T is excessively small, a quantity of light is decreased and the resolution of the imaging lens may be lowered, and when TTL is excessively lengthened, a quantity of necessary light is increased and the resolution of the imaging lens may be lowered.

EFLs of imaging lenses according to first and second embodiments, which will be described below, may be 9.94 to 16.5, that is, tele EFLs may be 16.5 and wide EFLs may be 9.94.

Further, EFLs of an imaging lens according to a third embodiment, which will be described below, may be 8.6 to 12.8, that is, a tele EFL may be 12.9 and a wide EFL may be 8.6.

Figure 1A:
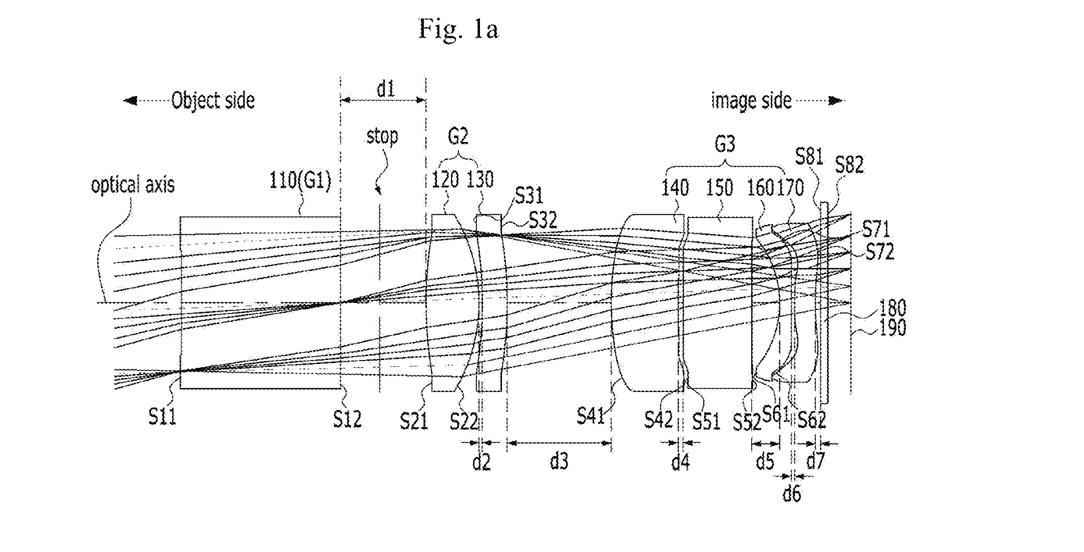
FIGS. 1a and 1b are views illustrating an imaging lens according to a first embodiment.
Figure 1B:
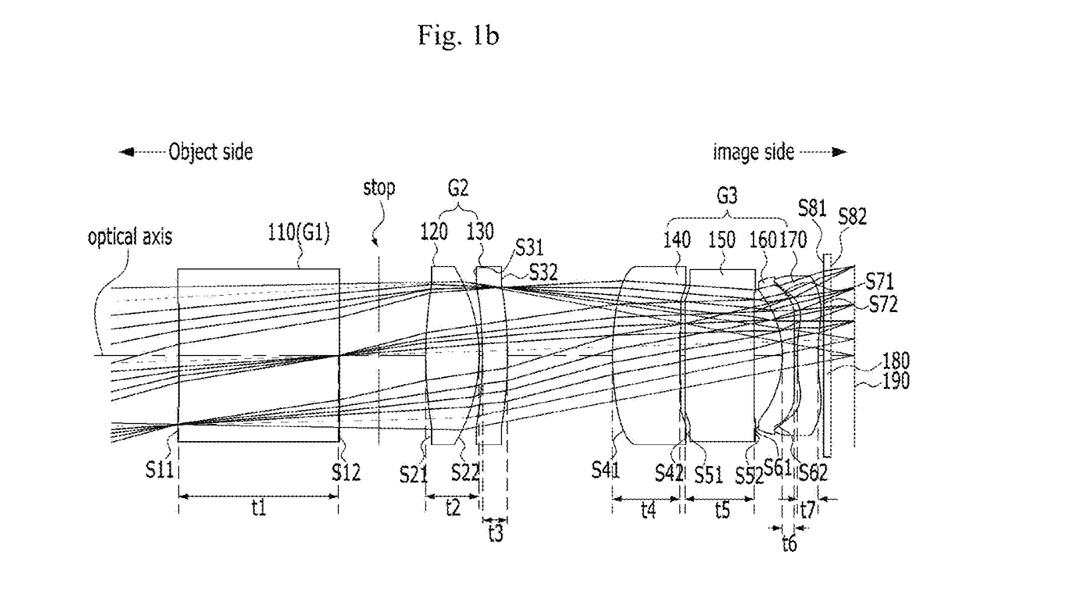

FIGS. 1a and 1b are views illustrating the imaging lens according to the first embodiment.

The imaging lens according to this embodiment includes first to third lens groups G1-G3, a filter 180 and a light receiving element 190, which are arranged sequentially from an object side to an image side so as to form the imaging lens in a camera module.

The first lens group G1 may include a first lens 110, the second lens group G2 may include a second lens 120 and a third lens 130, and the third lens group G3 may include fourth to seventh lenses 140-170. At least one of object surfaces and image surfaces of the above-described first lens 1102 to seventh lens 170 may be an aspherical surface, and when an aspherical surface is formed as at least one surface of the lenses, correction of various aberrations, such as spherical aberration, coma aberration and distortion, may be excellent.

Table 1 shows EFLs, etc. of the imaging lens according to the first embodiment in a wide mode, a middle mode and a tele mode.

TABLE 1

|  | Wide | Middle | Tele |
|---|---|---|---|
| EFL | 9.94 | 11 | 16.5 |
| BFL | 0.6521 | 1.56 | 6.1179 |
| FFL | −14.1764 | −15.6106 | −24.5528 |
| $F_{Number}$ | 2.5193 | 2.7814 | 4.125 |

A stop may be arranged between the first lens group G1 and the second lens group G2, and the position of the stop may be stationary, for example, the stop may be provided on the rear surface of the first lens group G1. The filter 180 may be a plate-shaped optical member, such as an infrared ray filter or the like, the cover glass 190 may be a cover glass for protecting an optical member, for example, an imaging surface, and the light receiving element may be an image sensor stacked on a printed circuit board (not shown). The light emitting element may be the image sensor, and horizontal and/or vertical lengths of a unit pixel of the image sensor may be 2 m (micrometer) or less. The above-described embodiment and other embodiments, which will be described below, may provide imaging lenses which may be applied to a camera module having high pixels and/or a large number of pixels, the above camera module may have an image sensor or light receiving element having high pixels and/or a large number of pixels, and in this case, horizontal and/or vertical lengths of a unit pixel thereof may be 2 m or less.

S11' may be an object surface of the first lens 110, S12' may be an image surface of the first lens 110, S21' may be an object surface of the second lens 120, S22' may be an image surface of the second lens 120, S31' may be an object surface of the second lens 120, S32' may be an image surface of the third lens 130, 'S41' may be an object surface of the fourth lens 140, S42' may be an image surface of the fourth lens 140, S51' may be an object surface of the fifth lens 150, S52' may be an image surface of the fifth lens 150, 'S61' may be an object surface of the sixth lens 160, S62' may be an image surface of the sixth lens 160, S71' may be an object surface of the seventh lens 170, and 'S72' may be an image surface of the seventh lens 170.

Table 2 shows radiuses of curvature, etc. of the image surfaces and the object surfaces of the first lens 110 to the seventh lens 170 of the imaging lens according to the first embodiment. Here, a radius of curvature of infinity indicates a flat surface, a − sign indicates a surface which is convex towards the image side, no sign, i.e., a + value, indicates a surface which is convex towards the object side, and these are the same in other embodiments which will be described below.

TABLE 2

|  | Radius of curvature (mm) | Thickness (mm) | Refractive index | Abbe's number |
|---|---|---|---|---|
| S11 | −83.50746 | 4.75 | 1.55442 | 56 |
| S12 | Infinity | A |  |  |
| S21 | 15.22416 | 1.598591 | 1.55442 | 56 |
| S22 | −5.33888 | 0.100157 |  |  |
| S31 | −8.05492 | 0.65751 | 1.661 | 20.4 |
| S32 | −11.57797 | 0.100277 + B |  |  |
| S41 | 6.92015 | 1.999811 | 1.55442 | 56 |

TABLE 2-continued

|  | Radius of curvature (mm) | Thickness (mm) | Refractive index | Abbe's number |
|---|---|---|---|---|
| S42 | 51.68015 | 0.192691 |  |  |
| S51 | −7.22958 | 2 | 1.661 | 20.4 |
| S52 | −60.27491 | 0.829393 |  |  |
| S61 | −3.85356 | 0.3 | 1.55442 | 56 |
| S62 | 4.76038 | 0.101489 |  |  |
| S71 | 2.66895 | 0.639961 | 1.661 | 20.4 |
| S72 | 5.07207 | 0.15318 |  |  |
| S81 | Infinity | 0.21 |  |  |
| S82 | Infinity | C + D |  |  |
| S91 | Infinity |  |  |  |

Here, A to D are variable, and may have values given in Table 3 below.

TABLE 3

|  | A | B | C | D |
|---|---|---|---|---|
| Wide | 2.493333109 | 3.033014803 | 0.652134553 | 0.037865415 |
| Middle | 2.303604572 | 2.311430255 | 1.560014501 | 0.031298517 |
| Tele | 0.108188844 | 0.1 | 6.117872231 | −0.099701394 |

Figure 2A:
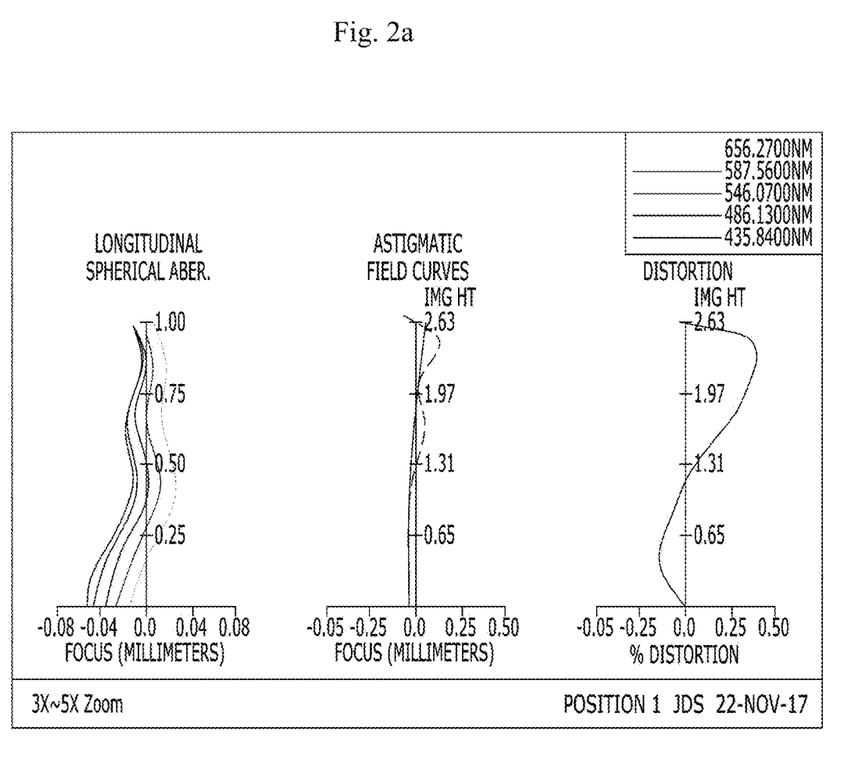
FIG. 2a illustrates graphs showing aberrations of the imaging lens according to the first embodiment in a wide mode.
Figure 2B:
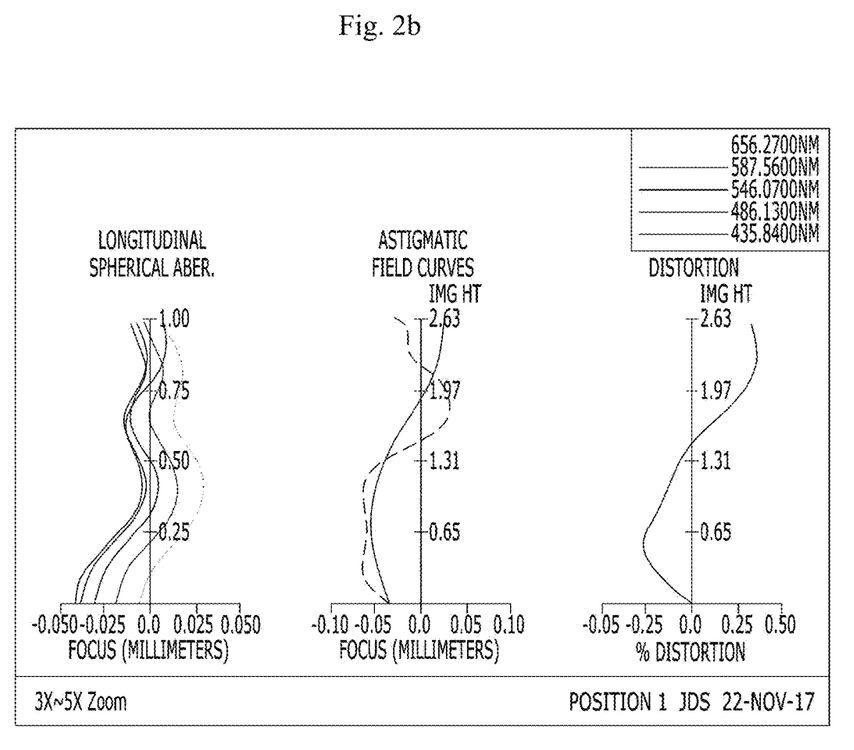
FIG. 2b illustrates graphs showing aberrations of the imaging lens according to the first embodiment in a middle mode.
Figure 2C:
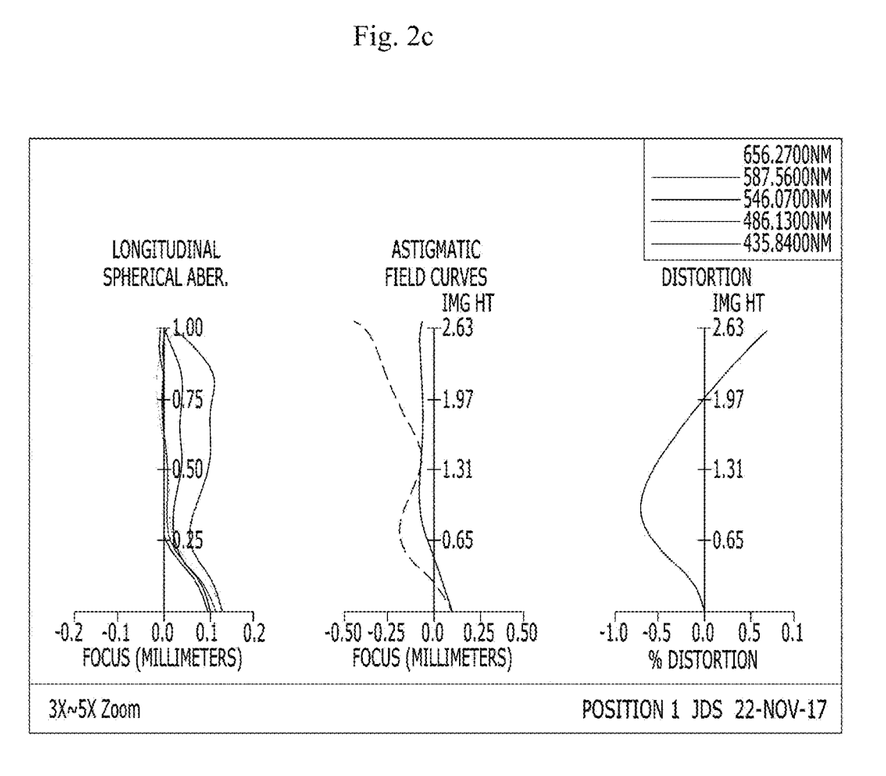
FIG. 2c illustrates graphs showing aberrations of the imaging lens according to the first embodiment in a tele mode.

Table 3 shows changes in the values of A to D of the image lens according to the first embodiment in the wide mode, the middle mode and the tele mode. That is, the value of A may be changed as the distance between the first lens group G1 and the second lens group G2 is changed, and the value of B may be changed as the distance between the second lens group G2 and the third lens group G3 is changed. FIG. 2a illustrates graphs showing aberrations of the imaging lens according to the first embodiment in the wide mode, FIG. 2b illustrates graphs showing aberrations of the imaging lens according to the first embodiment in the middle mode, and FIG. 2c illustrates graphs showing aberrations of the imaging lens according to the first embodiment in the tele mode. In the respective figures, graphs showing longitudinal spherical aberration, astigmatic field curves, and distortion are illustrated sequentially from the left, the Y-axis means the sizes of images, the X-axis means focal distances (in mm) and degrees of distortion (in %), and as curves approach the Y-axis, an aberration correcting function may be improved.

Figure 3A:
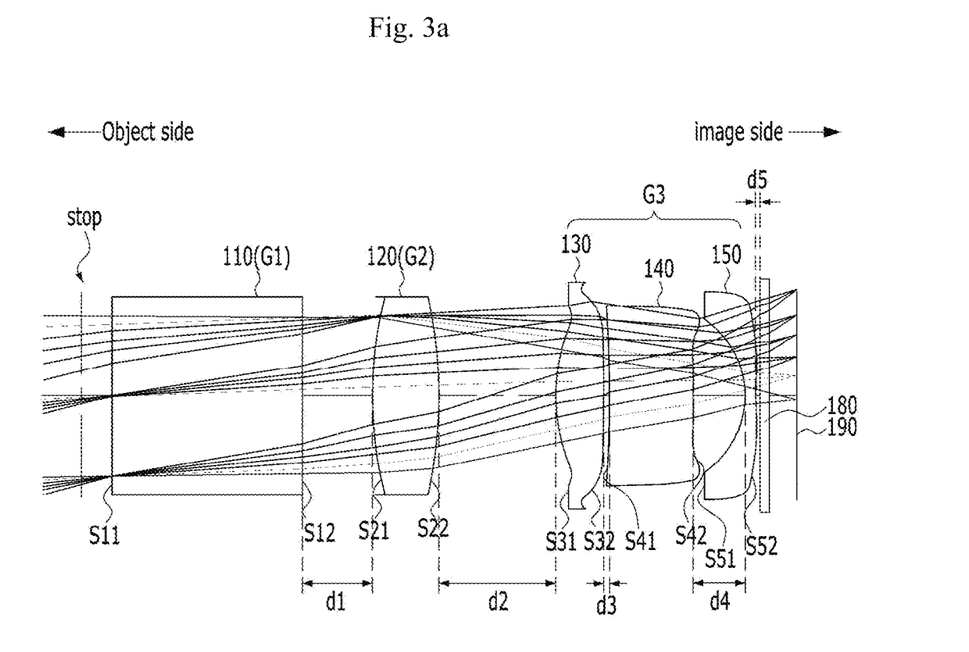
FIGS. 3a and 3b are views illustrating an imaging lens according to a second embodiment.
Figure 3B:
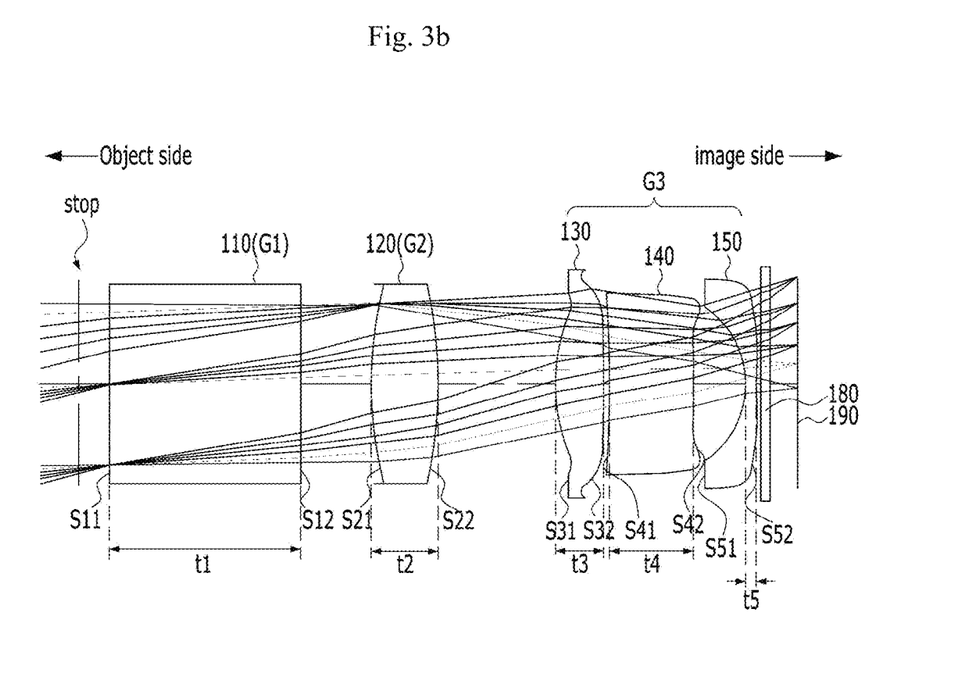

FIGS. 3a and 3b are views illustrating an imaging lens according to a second embodiment. A detailed description of some parts in this embodiment, which are substantially the same as those in the above-described first embodiment, is omitted because it is considered to be unnecessary.

The imaging lens according to this embodiment includes first to third lens groups G1-G3, a filter 180 and a light receiving element 190, which are arranged sequentially from an object side to an image side so as to form the imaging lens in a camera module.

The first lens group G1 may include a first lens 110, the second lens group G2 may include a second lens 120, and the third lens group G3 may include third to fifth lenses 130-150.

Table 4 shows EFLs, etc. of the imaging lens according to the second embodiment in a wide mode, a middle mode and a tele mode.

TABLE 4

|  | Wide | Middle | Tele |
|---|---|---|---|
| EFL | 9.94 | 11 | 16.5 |
| BFL | 0.59 | 1.2595 | 4.9831 |
| FFL | −21.0035 | −22.7093 | −31.9802 |
| $F_{Number}$ | 2.485 | 2.75 | 4.125 |

A stop may be arranged on the front surface, for example, an object surface, of the first lens group G1. Table 5 shows radiuses of curvature, etc. of the image surfaces and the object surfaces of the first lens 110 to the fifth lens 150 of the imaging lens according to the second embodiment.

TABLE 5

|  | Radius of curvature (mm) | Thickness (mm) | Refractive index | Abbe's number |
|---|---|---|---|---|
| S11 | 29.49037 | 4.75 | 1.5653 | 33.93 |
| S12 | Infinity | A |  |  |
| S21 | 20.21818 | 1.662728 | 1.491 | 51 |
| S22 | −7.51016 | 0.1 + B |  |  |
| S31 | 3.91412 | 1.253145 | 1.491 | 51 |
| S32 | −110.26845 | 0.170351 |  |  |
| S41 | −5.40555 | 1.999667 | 1.661 | 20.4 |
| S42 | −336.87025 | 1.280838 |  |  |
| S51 | −2.31164 | 0.3 | 1.49939 | 47.92 |
| S52 | 135.93422 | 0.1 |  |  |
| S81 | Infinity | 0.21 |  |  |
| S82 | Infinity | C + D |  |  |
| S91 | Infinity |  |  |  |

Here, A to D are variable, and may have values given in Table 6 below.

TABLE 6

|  | A | B | C | D |
|---|---|---|---|---|
| Wide | 1.628617519 | 2.7544747 | 0.589993963 | 0.1 |
| Middle | 1.594586616 | 2.1197223 | 1.259474236 | 0.089300774 |
| Tele | 0.1 | 0.1 | 4.983063739 | −0.1 |

Figure 4A:
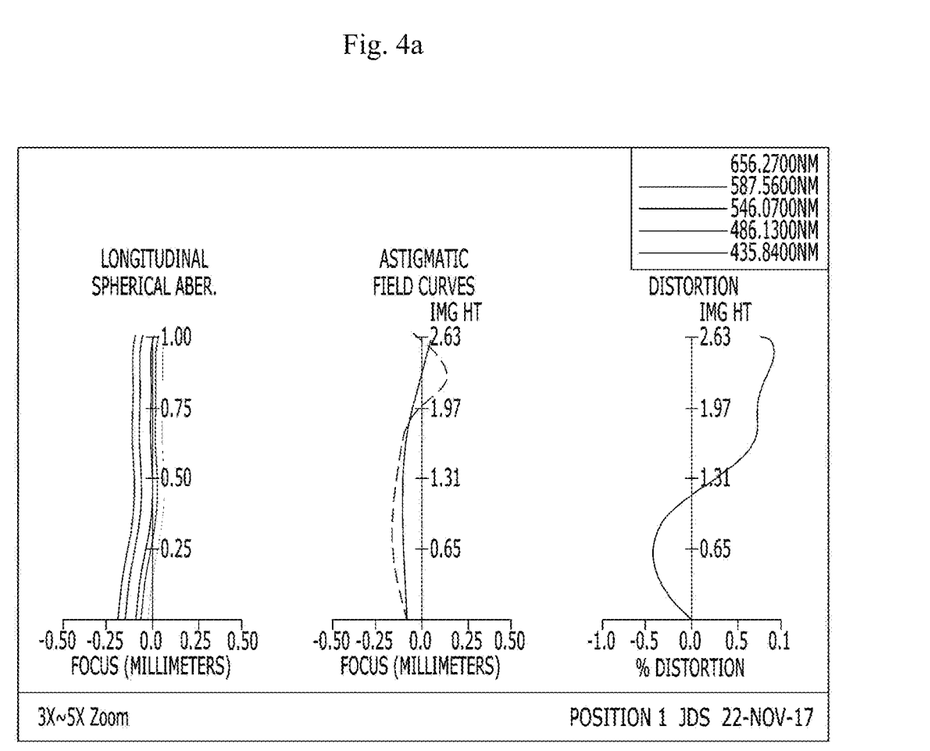
FIG. 4a illustrates graphs showing aberrations of the imaging lens according to the second embodiment in a wide mode.
Figure 4B:
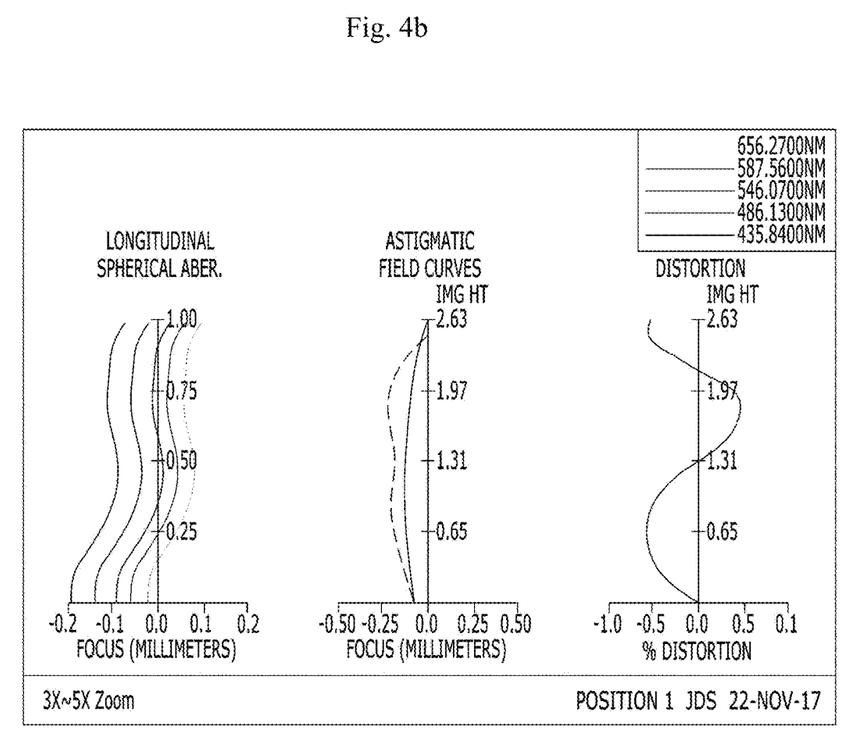
FIG. 4b illustrates graphs showing aberrations of the imaging lens according to the second embodiment in a middle mode.
Figure 4C:
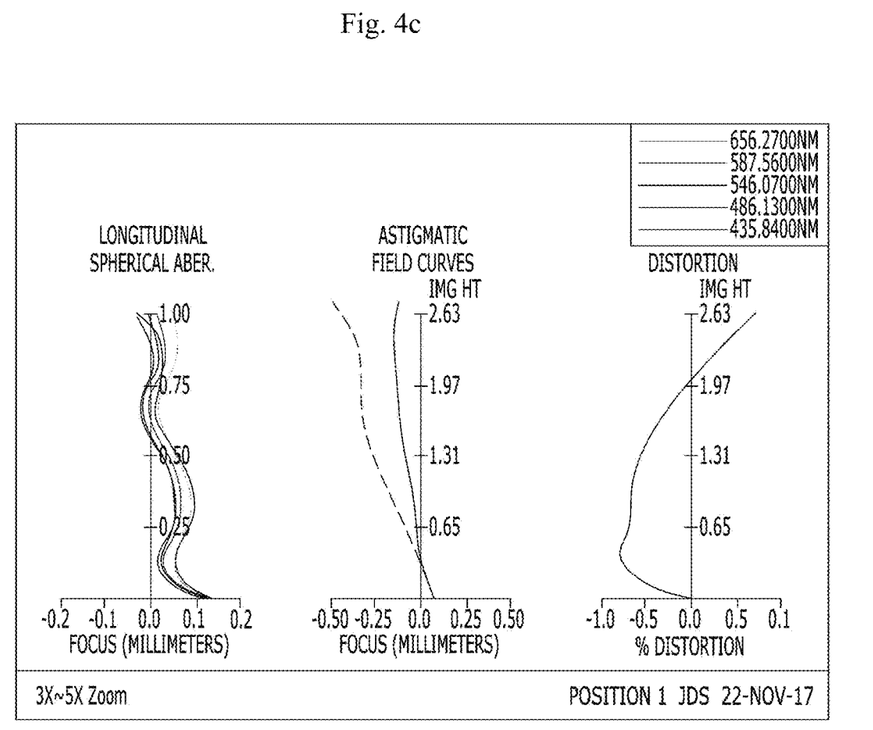
FIG. 4c illustrates graphs showing aberrations of the imaging lens according to the second embodiment in a tele mode.

Table 6 shows changes in the values of A to D of the image lens according to the second embodiment in the wide mode, the middle mode and the tele mode. That is, the value of A may be changed as the distance between the first lens group G1 and the second lens group G2 is changed, and the value of B may be changed as the distance between the second lens group G2 and the third lens group G3 is changed. FIG. 4a illustrates graphs showing aberrations of the imaging lens according to the second embodiment in the wide mode, FIG. 4b illustrates graphs showing aberrations of the imaging lens according to the second embodiment in the middle mode, and FIG. 4c illustrates graphs showing aberrations of the imaging lens according to the second embodiment in the tele mode.

Figure 5A:
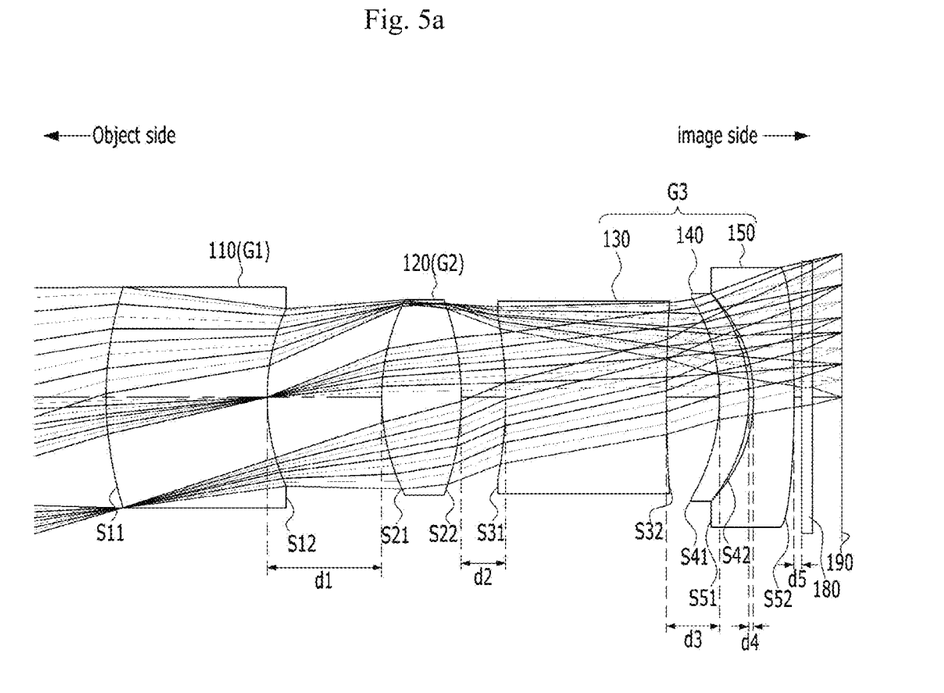
FIGS. 5a and 5b are views illustrating an imaging lens according to a third embodiment.
Figure 5B:
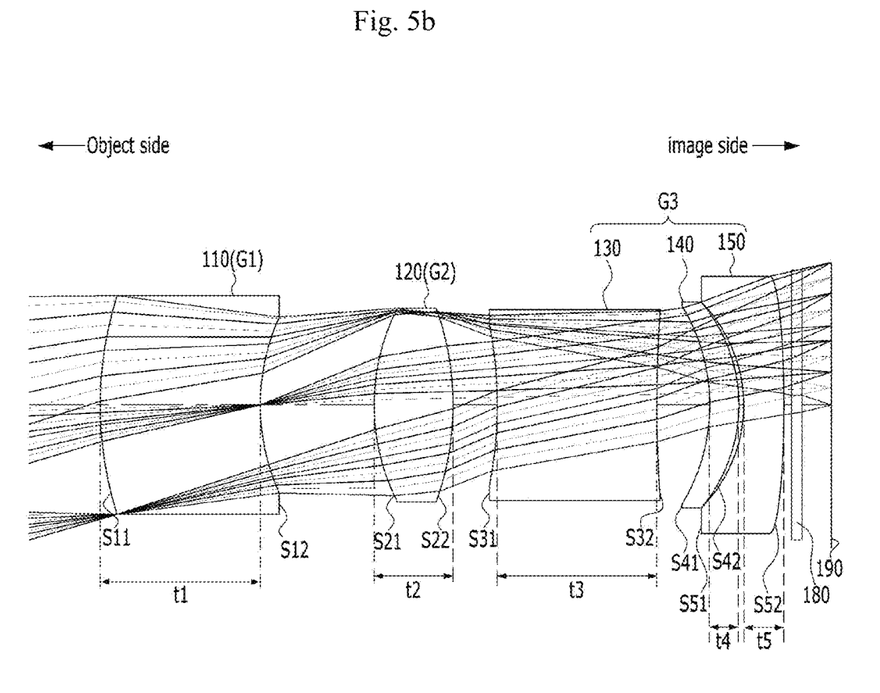

FIGS. 5a and 5b are views illustrating an imaging lens according to a third embodiment. A detailed description of some parts in this embodiment, which are substantially the same as those in the above-described first and second embodiments, is omitted because it is considered to be unnecessary.

The imaging lens according to this embodiment includes first to third lens groups G1-G3, a filter 180 and a light receiving element 190, which are arranged sequentially from an object side to an image side so as to form the imaging lens in a camera module.

The first lens group G1 may include a first lens 110, the second lens group G2 may include a second lens 120, and the third lens group G3 may include third to fifth lenses 130-150.

Further, the first lenses 110 in the first and second embodiments may be a prism, but the first lens 110 in this embodiment may not be a prism.

Table 7 shows EFLs, etc. of the imaging lens according to the third embodiment in a wide mode and a tele mode.

TABLE 7

|  | Wide | Tele |
|---|---|---|
| EFL | 8.6 | 12.8 |
| BFL | 0.5958 | 3.3328 |
| FFL | −11.0385 | −20.9963 |
| $F_{Number}$ | 2.15 | 3.2 |

A stop may be arranged between the first lens group G1 and the second lens group G2. Table 8 shows radiuses of curvature, etc. of the image surfaces and the object surfaces of the first lens 110 to the fifth lens 150 of the imaging lens according to the third embodiment.

TABLE 8

|  | Radius of curvature (mm) | Thickness (mm) | Refractive index | Abbe's number |
|---|---|---|---|---|
| S11 | 5.75201 | 3 | 1.661 | 20.4 |
| S12 | Infinity | A |  |  |
| S21 | 3.5461 | 1.498093 | 1.55442 | 56 |
| S22 | −4.885 | B |  |  |
| S31 | −7.81358 | 3 | 1.661 | 20.4 |
| S32 | 39.50551 | 0.137165 |  |  |
| S41 | −11.89454 | 0.567818 | 1.661 | 20.4 |
| S42 | −3.91053 | 0.068993 |  |  |
| S51 | −2.55616 | 0.770465 | 1.55442 | 56 |
| S52 | 134.42418 | 0.1 |  |  |
| S81 | Infinity | 0.21 |  |  |
| S82 | Infinity | C + D |  |  |
| S91 | Infinity |  |  |  |

Here, A to D are variable, and may have values given in Table 9 below.

TABLE 9

|  | A | B | C | D |
|---|---|---|---|---|
| Wide | 2.072867067 | 0.812389888 | 0.595820535 | −0.005852723 |
| Tele | 0.1 | 0.100019525 | 3.332786668 | −0.047616293 |

Figure 6A:
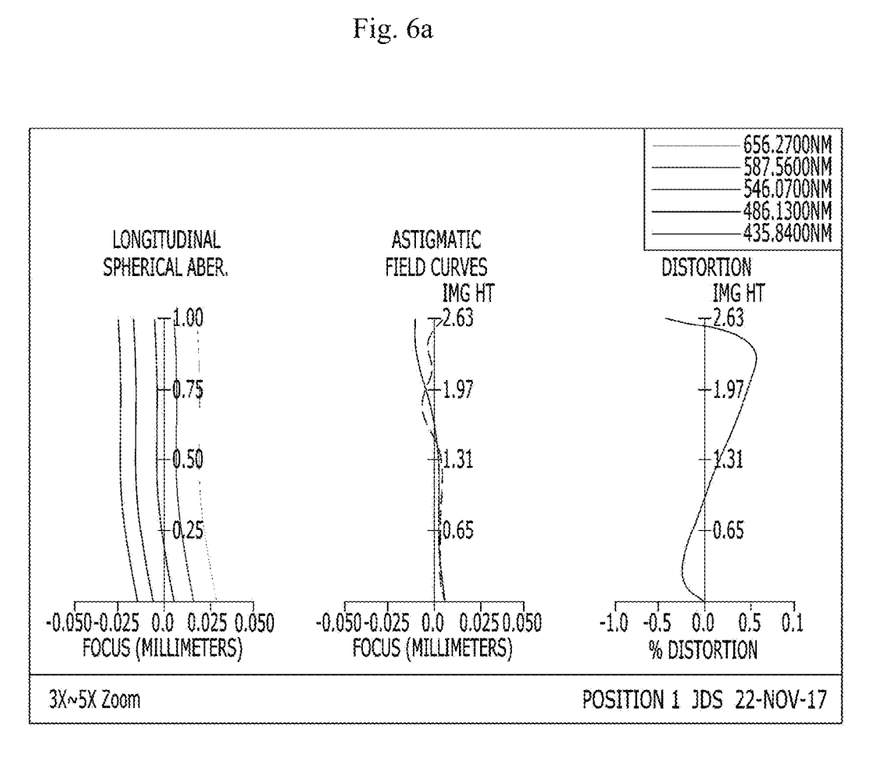
FIG. 6a illustrates graphs showing aberrations of the imaging lens according to the third embodiment in a wide mode.
Figure 6B:
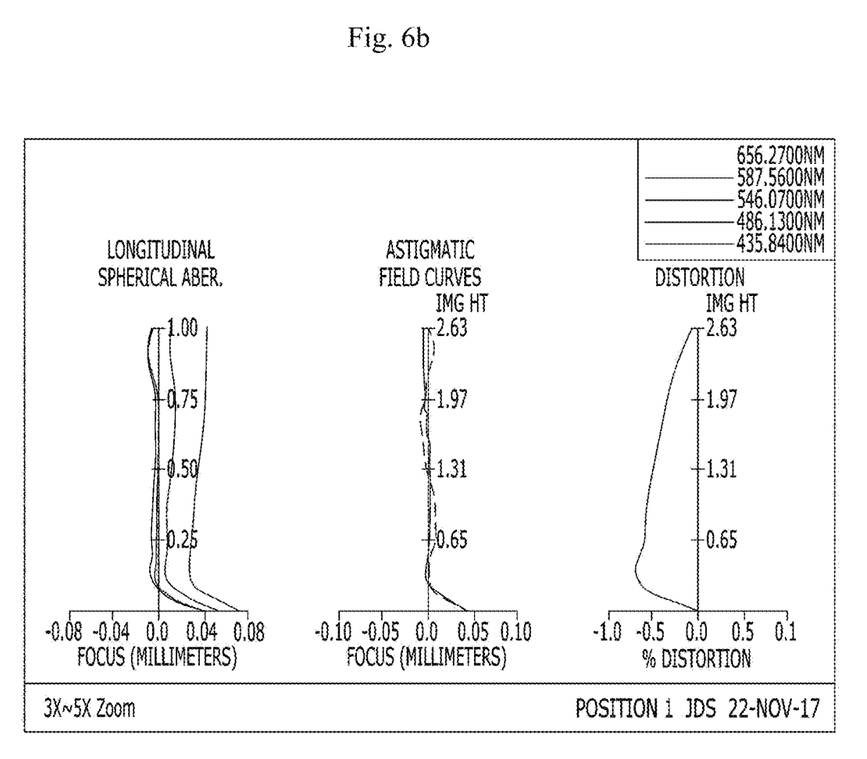
FIG. 6b illustrates graphs showing aberrations of the imaging lens according to the third embodiment in a tele mode.

Table 9 shows changes in the values of A to D of the image lens according to the second third embodiment in the wide mode and the tele mode. That is, the value of A may be changed as the distance between the first lens group G1 and the second lens group G2 is changed, and the value of B may be changed as the distance between the second lens group G2 and the third lens group G3 is changed. FIG. 6a illustrates graphs showing aberrations of the imaging lens according to the third embodiment in the wide mode, and FIG. 6b illustrates graphs showing aberrations of the imaging lens according to the third embodiment in the tele mode.

The camera module including the above-described imaging lens may be installed in various digital devices, such as a digital camera, a smart phone, a notebook, a tablet PC, etc., and particularly, be installed in a mobile device so as to implement a high-performance and ultra-thin zoom lens.

Although embodiments have been described with reference to a number of illustrative embodiments thereof, it should be understood that numerous other modifications and embodiments can be devised by those skilled in the art that will fall within the spirit and scope of the principles of the disclosure. For example, various variations and modifications are possible in the component parts and/or arrangements of the subject combination arrangement within the scope of the disclosure, the drawings and the appended claims. Further, it should be understood that differences regarding the modifications and applications are within the spirit and scope of the disclosure which is defined in the appended claims and their equivalents.

MODE FOR INVENTION

Modes for carrying out the disclosure have been described in the best mode for carrying out the disclosure.

INDUSTRIAL APPLICABILITY

An imaging lens according to embodiments is usable in a camera module and a digital device.

The invention claimed is:

1. An imaging lens comprising first to third lens groups arranged sequentially from an object side to an image side and having refractive power, wherein:
   a first lens of the first lens group has an object side configured to be concave towards the object,
   distances to the second lens group and the third lens group from the first lens group are variable such that a tele mode having a narrow angle of view and a wide mode having a wide angle of view can be implemented; and
   an EFL in a tele mode is no more than 2.5 times an EFL in a wide mode, $2<F_{Number}<5$, and 15 mm$<$TTL$\leq$40 mm.

2. The imaging lens according to claim 1, wherein a second lens of the second lens group has an object surface configured to be convex towards the object side and an image surface configured to be convex towards the image side.

3. The imaging lens according to claim 1, wherein the first lens group comprises one lens, the second lens group comprises two lenses, and the third lens group comprises four lenses.

4. The imaging lens according to claim 1, wherein the first lens group comprises one lens, the second lens group comprises one lens, and the third lens group comprises three lenses.

5. The imaging lens according to claim 1, wherein the EFLs of the image lens are within a range of 8.6 to 16.5.

6. The imaging lens according to claim 1, wherein a total magnification of the imaging lens is no more than 2.5 times.

7. The imaging lens according to claim 1, wherein the first lens group comprises a prism, and has a thickness of 3 mm or more.

8. A camera module comprising:
   an imaging lens comprising first to third lens groups arranged sequentially from an object side to an image side and having refractive power, wherein: a first lens of the first lens group has an object side configured to be concave towards the object, distances to the second lens group and the third lens group from the first lens group are variable such that a tele mode having a narrow angle of view and a wide mode having a wide angle of view can be implemented; and an EFL in a tele mode is no more than 2.5 times an EFL in a wide mode, $2<F_{number}<5$, and 15 mm$<$TTL$\leq$40 mm;

a filter configured to selectively transmit light having passed through the imaging lens depending on a wavelength of the light; and a light receiving element configured to receive light having passed through the filter, wherein a maximum distance between the first lens group and the light receiving element on an optical axis, as defined as a TTL, is more than 15 mm and is no more than 40 mm.

9. The camera module according to claim 8, wherein a maximum aperture of lenses forming the first to third lens groups is 0.2 to 0.3 times the TTL.

10. The camera module according to claim 9, wherein the maximum aperture of the lenses is 5 mm or less.

11. The imaging lens according to claim 1, wherein a thickness of the first lens of the first lens group is greater than sum of a thickness of a second lens and a third lens of the second lens group.

12. An imaging lens comprising first to third lens groups arranged sequentially from an object side to an image side and having refractive power, and a stop disposed between the first lens group and the second lens group wherein:

a first lens of the first lens group has an object side configured to be concave towards the object, distances to the second lens group and the third lens group from the first lens group are variable such that a tele mode having a narrow angle of view and a wide mode having a wide angle of view can be implemented; and an EFL in a tele mode is no more than 2.5 times an EFL in a wide mode, $2<F_{number}<5$, and 15 mm$<$TTL$\leq$40 mm.

13. The imaging lens according to claim 12, wherein a second lens of the second lens group has an object side configured to be convex towards an object and an image side configured to be convex towards an image.

14. The imaging lens according to claim 12, wherein the first lens group comprises one lens, the second lens group comprises two lenses, and the third lens group comprises four lenses.

15. The imaging lens according to claim 12, wherein the first lens group comprises one lens, the second lens group comprises one lens, and the third lens group comprises three lenses.

16. The imaging lens according to claim 12, wherein the EFLs of the image lens are within a range of 8.6 to 16.5.

17. The imaging lens according to claim 12, wherein a total magnification of the imaging lens is no more than 2.5 times.

18. The imaging lens according to claim 12, wherein the first lens group comprises a prism, and has a thickness of 3 mm or more.

19. The imaging lens according to claim 12, wherein a thickness of the first lens of the first lens group is greater than sum of a thickness of a second lens and a third lens of the second lens group.

20. The camera module according to claim 8, comprising a stop disposed between the first lens group and the second lens group, and wherein an image side of the first lens of the first lens group is flat.

* * * * *